May 12, 1964 J. E. SPINDLER 3,132,460
MACHINE FOR TEDDING HAY AND OTHER CROPS
Filed Aug. 8, 1960 2 Sheets-Sheet 1

May 12, 1964 — J. E. SPINDLER — 3,132,460
MACHINE FOR TEDDING HAY AND OTHER CROPS
Filed Aug. 8, 1960 — 2 Sheets-Sheet 2
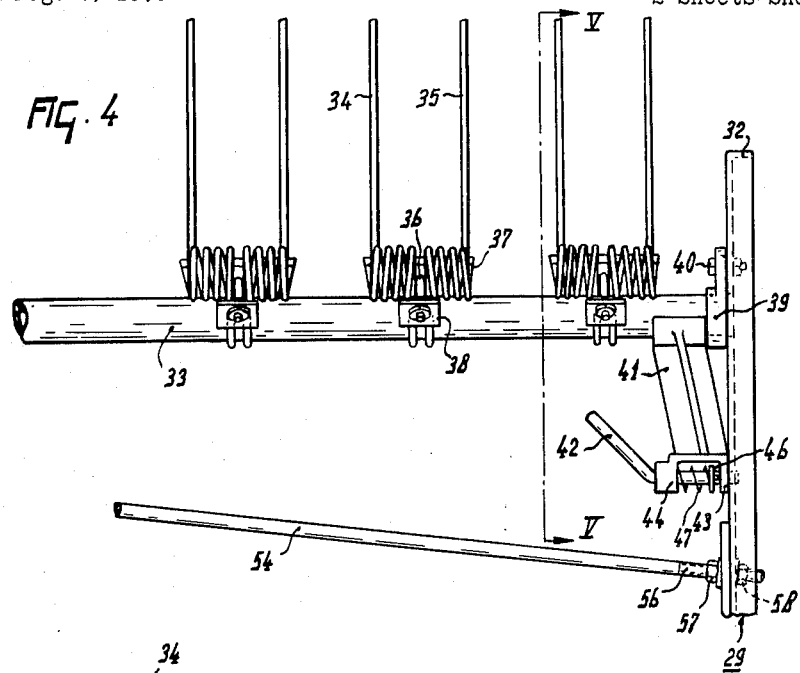
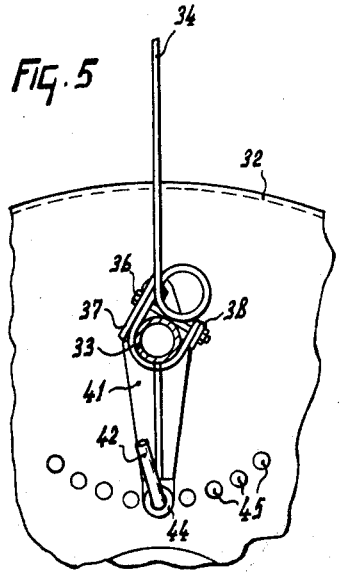

United States Patent Office 3,132,460
Patented May 12, 1964

3,132,460
MACHINE FOR TEDDING HAY AND
OTHER CROPS
John Edward Spindler, Malmesbury, England, assignor to C. van der Lely N.V., Maasland, Netherlands, a limited company of the Netherlands
Filed Aug. 8, 1960, Ser. No. 48,211
Claims priority, application Great Britain Aug. 7, 1959
12 Claims. (Cl. 56—372)

This invention relates to machines for tedding hay and other crops, of the kind comprising a frame in which a tine carrier is rotatably mounted, the tine carrier being provided with tines which are adapted to displace the crop during operation of the machine.

It is an object of the invention to provide tedding machines which are adaptable so as to operate efficiently with different types of crops in whichever of the two possible directions the tine carrier is rotated.

According to the invention, there is provided a tedding machine of the kind set forth, wherein each tine is angularly adjustable about an axis which extends at least substantially parallel to the axis of rotation of the tine carrier, and wherein each tine is adapted to be releasably secured in any one of a number of different angular settings, in each of which settings the angle of attack of the tine relative to the crop is different.

For a better understanding of the invention, and to show how the same may be carried into effect, reference will next be made, by way of example, to the accompanying drawings, in which:

FIGURE 4 is a view, on enlarged scale, of part of the machines shown in FIGURES 1 to 3, FIGURE 5 is a section taken on line V—V of FIGURE 4, and FIGURE 6 is a section on enlarged scale, taken on the line VI—VI of FIGURE 2.

Figure 1:
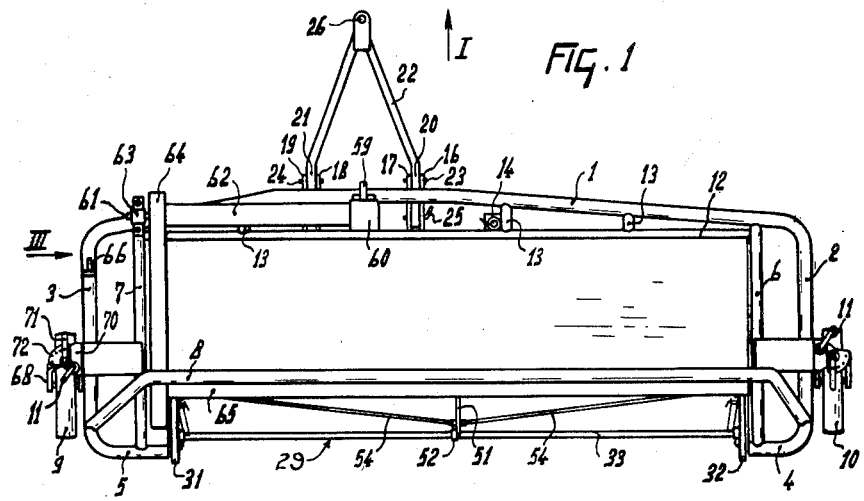
FIGURE 1 is a plan view of a tedding machine in accordance with the invention.

Referring to the drawings, the frame of the tedding machine comprises a transverse main frame beam 1 which is turned through approximately 90° at both ends to form upwardly inclined frame beams 2 and 3 whose free ends 4 and 5 are turned through a further 90° so that they extend substantially parallel to the length of the main frame beam 1. A frame beam 6 extends parallel to, and at a short distance from, the frame beam 2 between the end 4 and one end of the main frame beam 1.

A further frame beam 7 extends in similar relationship with the frame beam 3 between the end 5 and the other end of the main frame beam 1. The frame beams 2 and 3 are connected to one another by means of an arched frame beam 8 which is secured to the frame beams 2 and 3 close to the bends at which they merge respectively into the ends 4 and 5.

The frame is supported by two ground-engaging caster wheels 9 and 10. The ground wheel 9 is rotatably mounted in an inclined fork 68 carried at the lower end of a rod 69, the rod 69 being turnable about its own axis in a bracket 70 rigidly secured to the frame beam 3 of the machine. The rod 69, and thus the plane of rotation of the wheel 9, can be locked in any desired angular setting relative to the frame by means of an arm 71 which is slidable along the rod 69, but which cannot turn about the rod 69. The arm 71 is formed with a hole which can be brought into alignment with any one of a number of holes in a sector plate 72 rigid with the bracket 70. A locking pin can be inserted in the hole in the arm 71 and in a selected hole in the sector plate 72 to secure the plane of rotation of the ground wheel 9 in a desired angular setting relative to the frame. The height of the axis of rotation of the ground wheel 9 can be adjusted relative to that of the frame of the machine by means of a threaded crank 11 which is journalled in the bracket 70 and which passes through a correspondingly threaded bore in a travelling nut 73. The nut 73 is formed with upper and lower apertured lugs, through the apertures in which passes the rod 69, and between which is disposed a collar 74 rigid with the rod 69. It will be seen that, by turning the crank 11 in an appropriate direction, the travelling nut 73, and thus the axis of rotation of the wheel 9, will be either raised or lowered relative to the frame. Substantially identical means are provided for raising and lowering the ground wheel 10 and for adjusting the setting of its plane of rotation.

A frame beam 12 extends laterally between the frame beams 6 and 7 and is connected to the main frame beam 1 by means of a number of strengthening beams 13. A vertically disposed bearing 14 is secured at the junction between one of the strengthening beams 13 and the frame beam 12 and a rod 15, having a foot 15A at its lower end, is axially slidable in the said bearing 14. Transverse holes are formed in the sleeve 14 and rod 15 so that, by the use of a locking pin, the rod 15 can be secured in either a retracted or extended position or, if desired, in one or more intermediate positions. When the machine is not in use, the rod 15 may be extended so that the machine can be supported on the ground by means of the two ground wheels 9 and 10 and by the foot 15A. Two pairs of supporting plates 16, 17 and 18, 19 are secured to the frame beams 1 and 12 so that they extend in substantially vertical planes. A draw-bar 22 having two limbs 20 and 21 is pivoted to the plates 16 to 19, the limb 20 being pivoted between the plates 16 and 17 by means of a pivot pin 23 and the limb 21 being pivoted between the plates 18 and 19 by means of a pivot pin 24 co-axial with the pivot pin 23. The free end of each of the forks 20 and 21 is provided with a transverse hole which can be brought into alignment with a hole in the plates 16 to 19. Locking pins 25 can be introduced into the transverse holes in the ends of the limbs 20 and 21 and through the holes formed in the plates 16 to 19. Connecting means 26 is provided at the junction of the two limbs 21 and 22 of the draw-bar 20 by means of which the machine may be coupled to a tractor or like vehicle.

Figure 2:
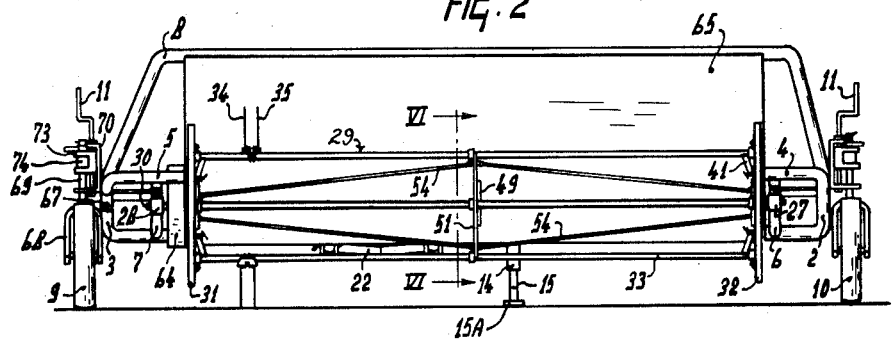
FIGURE 2 is a rear elevation of the machine shown in FIGURE 1.
Figure 3:
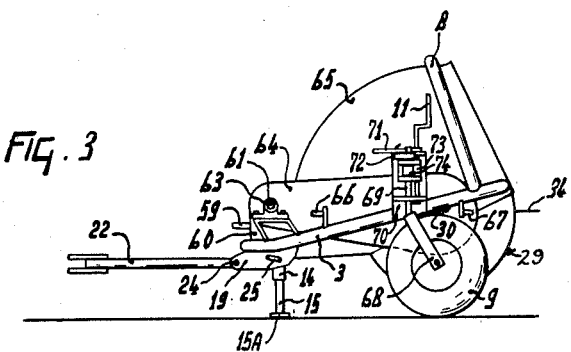
FIGURE 3 is a side elevation taken in the direction of arrow III of FIGURE 1.

Horizontal bearings 27 and 28 are secured to the frame beams 6 and 7 respectively and a tine carrier, specifically illustrated in the form of a cylindrically shaped body, generally indicated by the reference numeral 29, is rotatably journalled between them. The tine carrier 29 is formed with a central shaft 30 whose longitudinal axis affords the axis of rotation of the whole tine carrier 29, the said axis of rotation being disposed substantially perpendicular with and above the axes of rotation of the ground wheels 9 and 10. The two ends of the tine carrier 29 are formed by discs 31 and 32 which are rigidly secured to the shaft 30 adjacent its opposite ends. A further disc 49 (of smaller diameter than the discs 31 and 32) is secured to the shaft 30 midway between the said discs 31 and 32 and a supporting plate 51 is fastened to the disc 49 by means of bolts 50 (see FIGURES 2 and 6). The plate 51 is formed around its periphery with four pairs of holes 55, from which tensioning rods 54 extend in substantially opposite directions to the discs 31 and 32. Each rod 54 is threaded at its end 56 remote from the plate 51 the end 56 passing through a hole in the disc or spider 31 or 32 and being secured relative to the said disc by means of nuts 57 and 58 threaded on the end 56 and disposed on opposite sides of the disc. The holes in the discs 31 and 32 are much closer to the axis of rotation of the body 29 than are the holes 55 in the plate 51. Tensioning of the eight rods 54 imparts a good degree of rigidity to the tine carrier 29 while allowing the latter to be of relatively light weight.

Four tubular tool bars 33 extend substantially parallel to the axis of rotation of the tine carrier 29 between the discs 31 and 32. Each bar 33 has both its ends received within bearings 39 secured to the corresponding discs 31 and 32 by means of bolts 40, in such a way that the bar 33 is angularly adjustable about its own longitudinal axis. Approximately midway along the length of each bar 33, the bar passes through a sleeve bearing 52 (FIGURE 6) which is secured to the supporting disc 51 by means of a bolt 53. The sleeve bearing 52 acts to guide and support that intermediate part of the bar 33 which is disposed at a substantial distance from the discs 31 and 32.

Each bar 33 supports a number of pairs of tines 34 and 35, each pair of tines being formed from a single length of bent metal and being secured to the bar 33 between two clamping plates 37 and 38 drawn together by means of a nut and bolt 36. Each bar 33 can be secured in a desired position of angular adjustment about its own longitudinal axis by similar locking means disposed at both its two ends. Each of the locking means comprises an inclined arm 41 rigidly secured to the bar 33, the arm 41 having two spaced lugs 43 and 44 secured to it and the lugs having aligned holes in which a locking pin 42 is axially slidable parallel to the corresponding bar 33. The locking pin 42 is provided with a fixed collar 46 disposed between the lugs 43 and 44 and a helical compression spring 47 coiled around the locking pin 42 between the lug 44 and the collar 46 urges the locking pin 42 axially in a direction towards the right in FIGURE 4. The tip of the locking pin 42 can engage in any one of a row of nine holes 45 formed in the corresponding disc 31 or 32, the holes 45 being arranged in an arcuate row at 10° intervals and the center of curvature of the arc being afforded by the longitudinal axis of the corresponding bar 33. The center holes 45 in the various rows correspond to central angular settings of the tines 34 and 35 in which the straight portions thereof are disposed substantially radially with respect to the shaft 30 and in which the tip of each tine lies in substantially the same plane as the shaft 30 and the corresponding turnable bar 33. The angle of attack of the tines 34 and 35 relative to the crop or like material to be displaced can be adjusted out of the central setting by turning the four bars 33 about their longitudinal axes and securing them in desired angular settings by engaging the locking pins 42 in suitable ones of the rows of holes 45. In these alternative settings, the tip of each tine lies on one or other side of the aforementioned plane containing the shaft 30 and corresponding bar 33.

The tine carrier 29 is adapted to be rotated from the power take-off of a tractor or the like, to which end a gear box 60 is secured to the frame beams 1 and 12, the gear box 60 having an input shaft 59 which is keyed or splined for connection in a conventional way to the said power take-off and an output shaft 61 whose end remote form the gear box 60 is journalled in a bearing 63, the bearing 63 being secured to the frame beam 7. The major part of the length of the shaft 61 is surrounded by a guard sleeve 62. Aligned pulley wheels (not shown) are secured to the output shaft 61 and to the central shaft 30 respectively and a V-section belt is arranged around them in such a way that it transmits drive from the shaft 61 to the said shaft 30. A guard casing 64 is mounted around both the pulley wheels and around the driving belt. A screening box 65 extends around both ends of the tine carrier 29 and curves upwardly and rearwardly around its periphery between the frame beams 8 and 12 to both of which it is secured. Coupling means in the form of two co-axial link pins 66 and 67 are secured respectively above and below the inclined frame beam 3 so that they extend in a substantially horizontal direction.

During operation of the machine, it is propelled in a direction I (FIGURE 1) by means of a tractor or like vehicle to which it is coupled by means of the link or the like 26, the input shaft 59 also being coupled to the power take-off of the vehicle. At least one of the ground wheels 9 and 10 is fixed in a setting such that the axis of rotation of the tine carrier 29 is inclined at 90° to the direction of travel I, or such that the axis of rotation is inclined at an angle to the direction of travel I which is smaller than 90°. The tine carrier 29 follows undulations in the land surface due to its positions immediately above the ground wheels 9 and 10.

The tine carrier 29 can be rotated from the power take-off of the tractor or the like in either of the two possible directions and, by adjustment of the angular settings of the bars 33 in their bearings, the angle of attack of the tines 34 and 35 relative to the crop which is to be displaced can be adjusted to that angle which produces most efficient working having regard to the nature of the crop, the direction of rotation of the tine carrier 29 and the inclination of the axis of rotation of the latter to the direction of travel. In one direction of rotation the crop is thrown upwardly and rearwardly of the machine while, in the other, it is carried forwardly up and around the tine carrier 29 before being thrown rearwardly. In the embodiment illustrated, the tines are adjustable over a total angular range of about 80° and, in order that the benefits of the invention may be fully enjoyed, this range is preferably at least 60°. A very satisfactory tedding action is produced by increasing the rake angle of the tines towards the crop since, in this position, the crop leaves the tines at a later moment than when the tines are inclined more or less rearwardly of the direction of rotation. The crop is thus more vigorously displaced over a greater distance than would otherwise be the case and is left well dispersed on the land in a manner conducive to the further drying thereof. However, in some cases, crop tends to wind around or otherwise get tangled with the tines. This tendency can be overcome by inclining the tines rearwardly or radially with respect to the direction of rotation so that they readily release the crop earlier than in the case just described above. Usually the circumferential velocity of the tines is greater than the forward velocity of the device.

A machine in accordance with the invention may, if desired, be used in the following manner. The tractor or the like by which the machine is propelled is driven in top gear so that a relatively small number of revolutions of the motor of the tractor move the tractor at a relatively high speed. In view of the fact that the power take-off shaft is coupled to the motor, both the number of revolutions per minute of the shaft and the number of revolutions per minute of the tine carrier 29, which is driven thereby, are also small compared with the speed of the machine. The forward speed of the machine may therefore be greater than the circumferential velocity of the tines. If in these circumstances the tine carrier 29 is rotated in a direction which is such that lowermost tines move rearwardly with respect to the direction of travel, the crop which is engaged by the tines will be carried forward over some distance in the direction of travel of the machine. This produces a very gentle tedding action on the crop.

When it is desired to move the machine from one place to another without it performing any working operation, the machine is coupled to the lifting links of a tractor or the like by means of the two link pins 66 and 67 previously described so that the direction of travel is substantially parallel to the axis of rotation of the tine carrier 29. At least the ground wheel 10 is preferably left without its angular setting locked relative to the frame so that it may constitute a trailing caster wheel.

In this position, the width of the machine is a minimum which is important it it has to be taken through gateways and/or along public roads. As an alternative, a draw bar may be attached to the link pins 66 and 67 and the free end of the draw bar coupled to a towing vehicle. In either case, the draw bar 22 is tilted as far as possible upwardly in order that it shall not cause trouble by projecting any considerable distance laterally of the machine.

In the embodiment described, the tines 34 and 35 are of rectilinear configuration throughout the effective parts of their length. However, curved or irregularly shaped tines may be provided for use with crops whose nature makes the use of such tines desirable in order to produce an efficient tedding action.

What I claim is:

1. Apparatus for working crop lying on the ground comprising a frame, a tine carrier of substantially cylindrical shape supported in said frame for rotation about an axis, said tine carrier comprising: discs defining ends for said tine carrier, bars extending substantially parallel to said axis and supported by said discs for free rotation, crop working means fixedly secured to each of said bars and means for locking said bars to said discs in a choice of relative angular positions between said bars and discs for adjusting the relative position of said crop working means and the ground; wheels supporting said frame and enabling free movement thereof, and means varying the relative position of said frame and wheels to adjust the distance between the tine carrier and the crop working means secured thereto and the ground.

2. Apparatus as claimed in claim 1 wherein said crop working means comprises at least one tine rigidly coupled to each of said bars.

3. Apparatus as claimed in claim 1 comprising means for rotating said tine carrier in reverse direction.

4. Apparatus as claimed in claim 1 wherein the frame includes coupling means adapted for attachment to a vehicle, and enabling movement of said apparatus in a direction substantially parallel to the axis of rotation of the tine carrier and with the latter inoperative.

5. Apparatus as claimed in claim 1 wherein said means for varying the relative position of said frame and wheels comprises a crank and means coupling said crank to said wheels and frame to permit adjustment of the relative position of the wheels and frame by manipulation of said crank.

6. Apparatus as claimed in claim 1 wherein said means for locking the bars to the discs comprises a locking pin on said bars for each of said discs, said discs being provided with a plurality of arcuately arranged holes, the locking pins being engageable in said holes of each of the discs to lock said bars thereto in fixed angular relation corresponding to the positioning of said holes relative to said bars.

7. Apparatus as claimed in claim 6 wherein said holes define an axis of angular adjustment for each of said bars relative to said discs and wherein one of said holes in each of the discs corresponds to a position such that with said locking pins engaged therein said tine on the bars are coplanar with the axis of adjustment of the bars and the axis of rotation of the tine carrier.

8. Apparatus as claimed in claim 7 wherein each of said tine is radially disposed with respect to the axis of rotation of the tine carrier with said locking pins engaged in said one hole of the spiders.

9. Apparatus as claimed in claim 7 wherein said holes define an angular adjustment of said tine carrier beam with respect to said discs of at least 60°.

10. Apparatus as claimed in claim 1 wherein said tine carrier comprises an intermediate disc and a plate supported thereon, said plate rotatably supporting said bars.

11. Apparatus as claimed in claim 10 wherein said tine carrier further comprises adjustable tensioning rods extending between said discs defining the ends of the tine carrier and the plate supported in the intermediate disc.

12. Apparatus as claimed in claim 11 wherein said tensioning rods are coupled to said discs defining the ends of the tine carrier at a location radially inwards of the coupling between the tensioning rods and the plate supported on the intermediate disc.

References Cited in the file of this patent

UNITED STATES PATENTS

| | | |
|---|---|---|
| 2,548,329 | Van Sickle | Apr. 10, 1951 |
| 2,847,814 | Weaver | Aug. 19, 1958 |
| 2,850,863 | Pierson | Sept. 9, 1958 |
| 2,860,478 | Van de Lely et al. | Nov. 18, 1958 |
| 2,956,387 | Flinchbaugh et al. | Oct. 18, 1960 |

FOREIGN PATENTS

| | | |
|---|---|---|
| 531,552 | Belgium | Sept. 30, 1954 |
| 562,787 | Belgium | Dec. 14, 1957 |